July 16, 1957 N. S. OLESEN 2,799,309
SAW ATTACHMENT
Filed Nov. 22, 1955
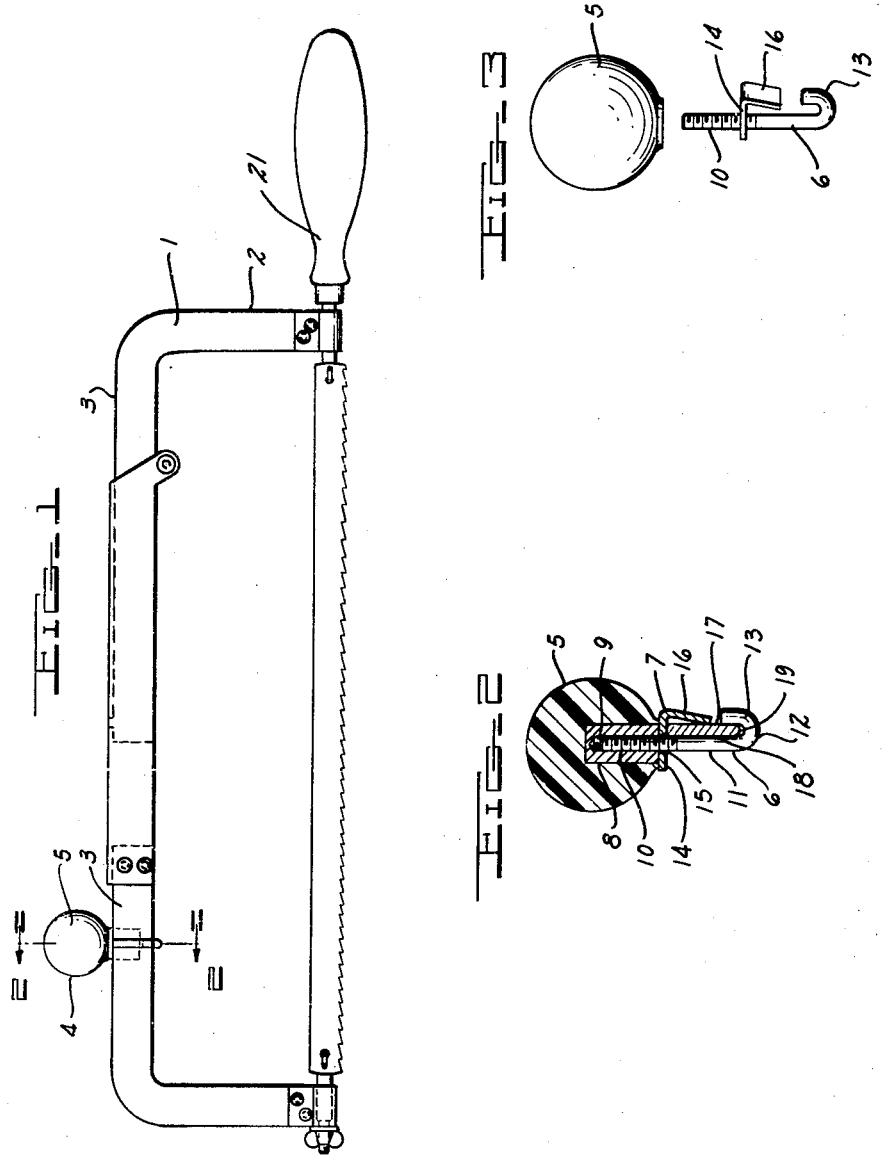
INVENTOR.
NELS S. OLESEN
BY
SMITH, OLSEN & KOTTS
ATTORNEYS

United States Patent Office 2,799,309
Patented July 16, 1957

2,799,309
SAW ATTACHMENT

Nels S. Olesen, Sidney, Mont., assignor to Murphy Machine Products, Detroit, Mich., a corporation of Michigan Application November 22, 1955, Serial No. 548,437

1 Claim. (Cl. 145—35)

This invention relates to a saw attachment.

In the use of a saw, and particularly a hacksaw, there are many occasions when the workpiece is so hard as to require that more manual pressure be applied to the saw than can be conveniently applied with one hand. The conventional hacksaw is provided with a pressure-applying element in the form of a single handle, and no other pressure-applying element is available such as would conveniently permit of two-handed saw operation. It is desirable, therefore, to equip the saw with a second pressure-applying element for permitting and facilitating two-handed saw operation.

In many instances it is further desirable that mechanism be provided whereby the saw user can conveniently hold the saw in aligned position in the desired cutting direction. Preferably, therefore, the second pressure-applying element should be of such design and construction as to aid the saw user to align and hold the saw in cutting position throughout the cutting operation.

The present invention incorporates a handle or pressure-applying element which is adapted for detachable securement on a hacksaw. Such detachable securement permits the element to be installed on and removed from different saws as desired by the user.

The construction and design of the element are such that when it is installed on a saw it may be employed as a pressure-applying element and saw-aligning mechanism.

One object of the invention is to provide a low cost saw attachment which permits the saw user to conveniently apply pressure on the saw with both of his hands, thereby enabling him to saw hard workpiece materials quickly and easily.

Another object is to provide a saw attachment which aids the saw user to conveniently hold the saw in its desired cutting direction prior to and during the cutting operation, thereby enabling him to effect a more accurate saw cut than might otherwise be possible.

Another object is to provide a saw attachment which may be employed as a pressure-applying medium and/or saw-aligning mechanism, and which may be installed on and removed from a saw quickly and easily so as to permit its ready removal and replacement.

Another object is to provide a saw attachment which may be employed as a pressure-applying medium and/or saw-aligning mechanism, and which incorporates a minimum number of parts whereby to reduce its manufacturing cost.

Another object is to provide a saw attachment which may be employed as a pressure-applying medium and/or saw-aligning mechanism, and wherein the component parts are low cost items whereby to further reduce manufacturing costs.

Another object is to provide a saw attachment which may be employed as a pressure-applying medium and/or saw-aligning mechanism, and wherein the attachment is so attached to the saw as to prevent inadvertent loosening or removal from the saw.

Other objects of this invention will appear in the following description and appended claim, reference being had to the accompanying drawings forming a part of this specification wherein like reference characters designate corresponding parts in the several views.

In the drawings:

Figure 1 is an elevational view of a conventional hacksaw on which is secured one embodiment of the invention, Figure 2 is a sectional view taken on line 2—2 in Figure 1, and Figure 3 is an exploded view of the Figure 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a conventional hacksaw 1 which includes a blade-carrying frame 2. Frame 2 includes a web portion 3, and adapted for securement on said web portion is an attachment 4.

Attachment 4 includes a handle element in the form of a knob 5, and a handle-securing mechanism in the form of a rod member 6 and a bracket 7.

Knob 5 includes an insert member 8 internally threaded at 9. If desired, member 8 could be omitted and threads 9 formed directly in the knob. Both knob constructions may be considered as internally threaded knob constructions.

Rod member 6 includes a threaded end portion 10, a body portion 11 and an angularly turned end 12 which forms a U-shaped end portion 13.

Bracket 7 includes a wall 14 having an aperture 15 therethrough for the loose reception of the bracket on rod member 6. Wall 14 is provided with a right angularly turned end portion 16 which, in the Figure 2 installed position seats against side face 17 of web portion 3.

Prior to installation of attachment 4 on web portion 3 the attachment parts are in completely disassembled positions. Installation of the attachment is effected by positioning rod member 6 along side of web portion 3 with body portion 11 extending along side face 18 of portion 3 and with U-shaped end portion 13 hooked under edge 19 of portion 3. Bracket 7 is then moved down on rod 6 until end portion 16 seats against face 17 of portion 3. The installation operation is completed by threading knob 5 onto threaded portion 10 until it seats against wall 14. Threaded portions 9 and 10 are out of vertical alignment with web portion 3, and bracket 7 is therefore necessary in order to hold body portion 11 in its desired position adjacent face 18. In operation of the attachment knob 5 serves as an auxiliary pressure-applying element in addition to the conventional pressure-applying handle 21. Knob 5 serves further to aid the saw user to hold the saw in cutting position throughout the cutting operation, thereby enabling him to effect a more accurate saw cut than might otherwise be possible.

The design and construction of the attachment are such as to permit low manufacturing costs and ready installation on different saws.

I claim:

A hacksaw attachment comprising a rod of circular cross section having one end portion turned to provide a U-shaped section for hooking under the lower edge of a hacksaw frame, an intermediate portion of the rod being straight for positionment against a side surface of a hacksaw frame, and the other end portion of the rod being threaded; a bracket having a first leg and a second leg extending laterally from said first leg at an acute angle thereto; said first leg having an opening therein for loosely positioning the bracket on the rod with the threaded portion thereof extending beyond the bracket, the second leg extending at a slight angle toward and alongside the rod in a direction away from the threaded portion; and a knob having an internally threaded bore meshing with the threaded portion of the rod; the bottom surface of the knob being adapted to press on the first leg of the bracket to firmly retain the knob, bracket and rod on a hacksaw frame; the spacing between the free edge of the second leg and a point in alignment with the adjacent edge of the opening in the first leg being slightly less than the hacksaw frame thickness before threading of the knob on the rod, whereby upon application of the knob to the rod with the attachment on a hacksaw frame the bracket exerts an axial pressure on the knob tending to prevent unscrewing of said knob from the rod.

References Cited in the file of this patent

UNITED STATES PATENTS

| | | |
|---|---|---|
| 162,022 | Boynton | Apr. 13, 1875 |
| 286,968 | Sloan | Oct. 16, 1883 |
| 341,703 | Eyck | May 11, 1886 |
| 1,194,234 | Remington | Aug. 8, 1916 |
| 2,615,485 | Canter | Oct. 28, 1952 |